US 8,614,681 B2

(12) United States Patent
Hill et al.

(10) Patent No.: US 8,614,681 B2
(45) Date of Patent: Dec. 24, 2013

(54) MULTITOUCH INPUT TO TOUCHPAD DERIVED FROM POSITIVE SLOPE DETECTION DATA

(75) Inventors: Jared C. Hill, Castle Rock, CO (US);
Richard D. Woolley, Orem, UT (US)

(73) Assignee: Cirque Corporation, Salt Lake City, UT (US)

( * ) Notice: Subject to any disclaimer, the term of this patent is extended or adjusted under 35 U.S.C. 154(b) by 472 days.

(21) Appl. No.: 12/815,150

(22) Filed: Jun. 14, 2010

(65) Prior Publication Data
US 2011/0096003 A1    Apr. 28, 2011

Related U.S. Application Data

(60) Provisional application No. 61/186,792, filed on Jun. 12, 2009.

(51) Int. Cl.
*G06F 3/041* (2006.01)

(52) U.S. Cl.
USPC ........ 345/173; 345/156; 345/174; 178/18.01; 178/18.02; 178/18.06

(58) Field of Classification Search
USPC ............... 345/173–178; 178/18.01–20.04
See application file for complete search history.

(56) References Cited

U.S. PATENT DOCUMENTS

| | | | |
|---|---|---|---|
| 5,207,491 A | 5/1993 | Rottinghaus | |
| 2004/0188151 A1 | 9/2004 | Gerpheide et al. | |
| 2005/0052427 A1* | 3/2005 | Wu et al. | 345/173 |
| 2006/0279551 A1* | 12/2006 | Lii et al. | 345/173 |
| 2007/0165005 A1 | 7/2007 | Lii et al. | |
| 2007/0285404 A1* | 12/2007 | Rimon et al. | 345/173 |
| 2008/0036473 A1 | 2/2008 | Jansson et al. | |
| 2008/0158176 A1 | 7/2008 | Land et al. | |
| 2008/0158185 A1 | 7/2008 | Westerman | |
| 2009/0141046 A1 | 6/2009 | Rathnam et al. | |
| 2010/0053091 A1* | 3/2010 | Lee et al. | 345/173 |
| 2010/0193258 A1* | 8/2010 | Simmons et al. | 178/18.06 |

* cited by examiner

*Primary Examiner* — Gregory J Tryder
(74) *Attorney, Agent, or Firm* — Morriss O'Bryant Compagni, PC

(57) ABSTRACT

A method for using existing touchpad hardware to detect and track multiple objects such as fingers that are in contact with a touchpad, wherein the method extracts information from data that is already being collected, wherein analysis of the data is simplified by identifying objects by only looking for a positive slopes and negative slopes to identify multiple objects in data from the touchpad.

10 Claims, 3 Drawing Sheets

MULTITOUCH INPUT TO TOUCHPAD DERIVED FROM POSITIVE SLOPE DETECTION DATA

CROSS REFERENCE TO RELATED APPLICATIONS

This document claims priority to and incorporates by reference all of the subject matter included in the provisional patent application Ser. No. 61/186,792.

BACKGROUND OF THE INVENTION

1. Field of the Invention

This invention relates generally to touchpads. More specifically, the present invention is a method for using data from a touchpad to detect and track multiple objects that are touching a surface thereof. The invention uses the data that is already provided by a touchpad without having to make modifications to touchpad hardware.

2. Description of Related Art

Hereinafter, references to a touchpad shall include all touch sensitive surfaces including touchpads and touch screens. There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

The prior art includes a description of a touchpad that is already capable of the detection and tracking of multiple objects on a touchpad. This prior art patent teaches and claims that the touchpad detects and tracks individual objects anywhere on the touchpad. The patent describes a system whereby objects appear as a "maxima" on a curve. Consequently, there is also a "minima" which is a low segment of the curve where there is no detection of an. FIG. 2 is a graph illustrating the concept of a first maxima 30, a minima and a second maxima 34 that is the result of the detection of two objects on a touchpad.

It would be an advantage over the prior art to provide a new detection and tracking method that does not require the system to determine how many objects are on the touchpad surface, and yet still be capable of tracking them.

BRIEF SUMMARY OF THE INVENTION

In a first embodiment, the present invention is a method for using existing touchpad hardware to detect and track multiple objects such as fingers that are in contact with a touchpad, wherein the method extracts information from data that is already being collected, wherein analysis of the data is simplified by identifying objects by only looking for a positive slopes and negative slopes to identify multiple objects in data from the touchpad.

These and other objects, features, advantages and alternative aspects of the present invention will become apparent to

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
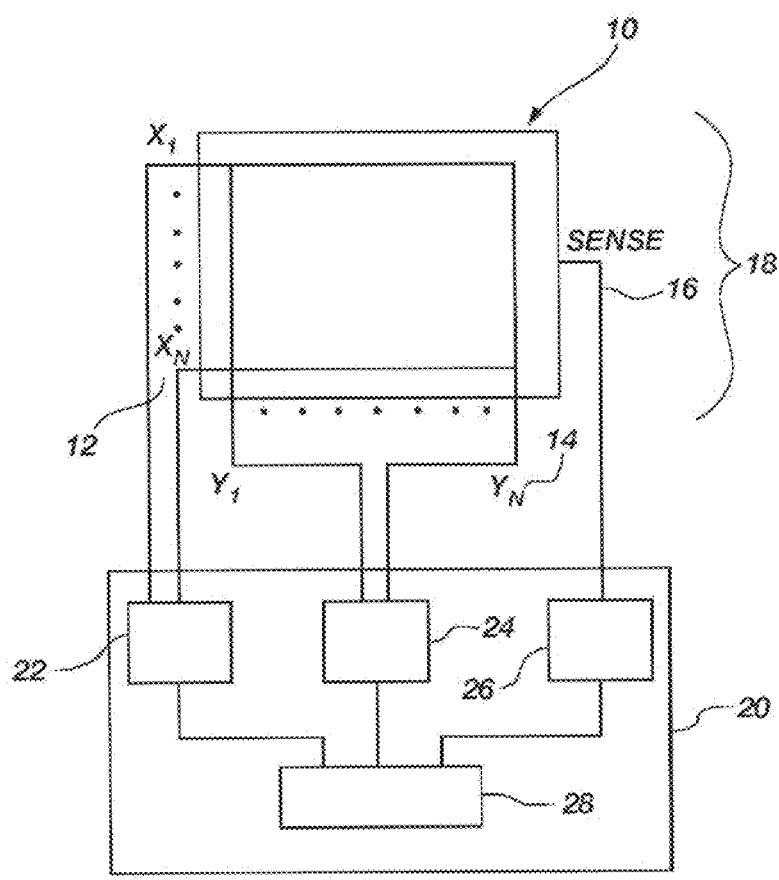
FIG. 1 is a block diagram of operation of a first embodiment of a touchpad that is found in the prior art, and which is adaptable for use in the present invention.
Figure 2:
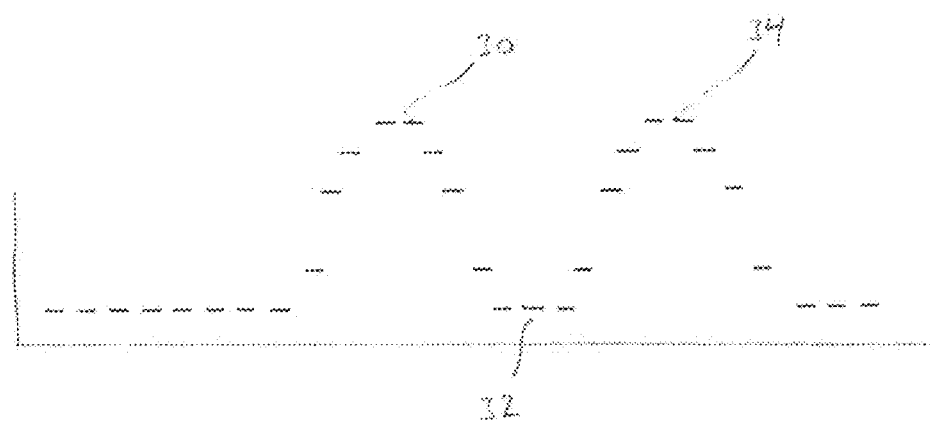
FIG. 2 is a graph from the prior art that shows having to identify a maxima for each object detected and an intervening minima.
Figure 3:
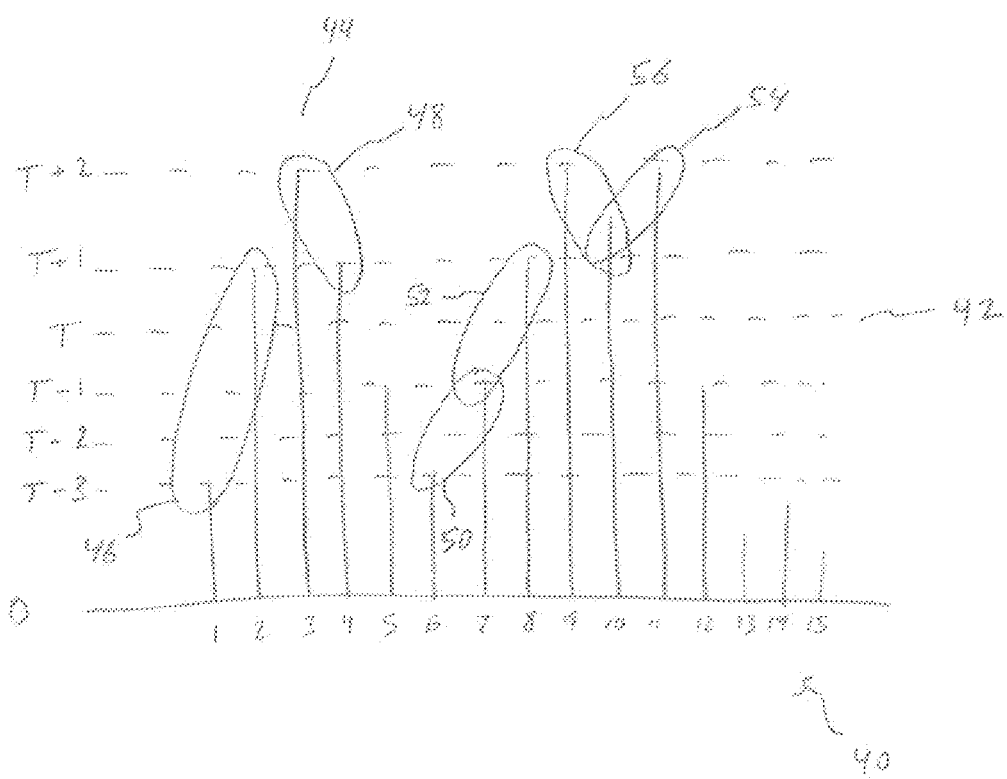
FIG. 3 is a graph that shows what types of measurements qualify as positive slopes and negative slopes to identify the presence but not the location of multiple fingers.

FIG. 3 is a graph that shows data points collected from a touchpad operating using a first embodiment of the present invention. The system requires that one X electrode and one Y electrode be removed from the set of electrodes being used to collect data from the touchpad. These two electrodes are then tied to ground through a capacitor. Electrodes are then driven and balanced against these electrodes coupled to the capacitor to ground. When a finger is placed on the touchpad, the only influence that the finger has is on that single driven electrode. When a finger is placed on a touchpad and over the electrode being driven, the signal on that electrode will be driven positive. The more signal that the driven electrode has on it, the more positive the signal on that electrode will be.

FIG. 3 is an example of a graph showing a signal on each of the electrodes on the X axis that is caused by two objects being present on a surface thereof. The Cirque controller IC has sixteen X electrodes and twelve Y electrodes. Taking one electrode away from each axis to act as the reference against which the other electrodes are measured or balanced leaves fifteen X electrodes and eleven Y electrodes for taking measurements on the touchpad.

It should be understood that the number of X and Y electrodes is arbitrary and can vary according to the controller IC being used to take measurements. This example of fifteen X electrodes being available for measurements is an example only and should not be considered as a limiting factor of the invention.

A finger is present on the touchpad with the center of the finger designated by point 44. In the present invention, the electrodes are scanned from one side of the touchpad to the other. The decision is arbitrary. We will assume for this example that scanning is from left to right.

In order for a measurement to be considered a "positive slope" that indicates the presence of a finger, the positive slope must be present, and the measurement must be greater than some selected "threshold" value. The threshold value is indicated on this graph as threshold value T 42. For the slope to be considered a positive one, the magnitude of the rise in signal strength must be at least two predetermined threshold units.

The threshold value T 42 is shown as a matter of practicality to be above some level above which it is determined that false positive signals are generally going to be avoided, because it can be assumed that there is noise in all touchpad systems. However, it may be necessary to calibrate a system to account for the noise inherent in different touchpad systems, and thereby adjust the threshold value T 42.

The measurements that are grouped together as measurement 46 indicate that the signal on the second X electrode is greater than the signal on the first X electrode, and that there is a rise in signal strength of at least two threshold units. In this case, there is a rise of four threshold units, and thus there is a positive slope because we are measuring from left to right. Furthermore, the measurement 46 exceeds the threshold value T 42. This indicates the presence of a finger, without ever having to identify any maxima that are indicative of a centroid of a finger.

In the present invention, a slope counter is used to track positive slopes which exceed the threshold value T 42. The threshold counter is therefore incremented to a value of "1".

Once a positive slope that exceeds the threshold value T 42 has been identified, the system now tries to identify a sufficiently large negative slope, still proceeding from left to right, that would indicate that an edge of the finger has been reached. The first sufficiently large negative slope is identified by the measurement 48.

In this example, a negative slope that is sufficiently large to indicate that the edge of a finger has been reached uses different criteria. Specifically, there only needs to be a decrease of one threshold unit. After finding the negative slope, the system again looks for another positive slope and decrements the threshold counter to a value of "0". The first positive slope at measurement 50 will not be counted as a positive slope because it does not pass the threshold value T 42. However, the next measurement 52 is a positive slope because it changes by at least two threshold units, and it exceeds the threshold value T 42, and thus is identified as another finger. The threshold counter is again incremented to a value of "1".

It is important to recognize that maximums and minimums of signal strength have never been identified, but only positive and negative slopes from data that has always been collected from the touchpad hardware. Another point to note is that no actual location of any finger has been identified either. The presence of fingers has been identified, but not their locations.

It was noted that as a practical matter of implementation, the present invention also requires that any positive slope also not only be positive and pass the threshold value T 42, but it must also rise at least two predetermined threshold units. Thus, the first positive slope measurement 46 rises from T−3 to T 42. The second positive slope measurement 52 rises from T−1 to T+1. This limitation of the system is useful for circumstances where a finger may be "fat" or rolled on its side. Such a placement of a finger can result in measurement 54. Because measurement 54 did not rise at least two predetermined threshold units, it is not considered a positive slope that would indicate a separate finger even though the negative slope measurement 56 has been measured.

The actual value of "threshold units" can be determined later, and should not be considered to be a limiting factor of the present invention. What is important is that the methodology of how to determine the presence of fingers be identified.

Another feature of the present invention is a determination of the strength of a signal. The strength of a signal is a function of the number of predetermined threshold units that the positive slope has risen.

It should be apparent that if the presence of fingers can be measured using the X electrodes, the same measurements and the same information can be taken from measurements of the Y electrodes. Thus, a graph can also be generated which shows that measurements on Y electrodes will also show the presence of the fingers that were found on the X electrodes. When the location of fingers is not being determined but only the numbers of fingers present, then that information can be taken from the X or the Y electrodes.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for determining the number of objects that are present on a touch sensitive surface, said method comprised of:
   1) providing a plurality of parallel X electrodes disposed on a first layer of a substantially transparent substrate, and a plurality of parallel Y electrodes disposed on a second layer of the substrate, wherein the Y electrodes are coplanar with and orthogonal to the X electrodes;
   2) measuring a signal on each of the plurality of X electrodes, proceeding from a first side of the X electrodes to an opposite second side;
   3) analyzing the measurements in order to identify objects by determining if any two measurements of adjacent X electrodes show a positive slope in signal strength, and which passes from below a threshold value to above the threshold value, so as to indicate the presence of a conductive object, wherein finding the positive slope includes selecting the threshold value for the signal strength and selecting a threshold unit, and then assigning the positive slope to be a measurement of signal strength of two adjacent electrodes, wherein the signal strength must rise from below the threshold value to above the threshold value, and wherein the total change in measured signal strength must be at least two threshold units;
   4) analyzing the measurements in order to identify a negative slope after the positive slope;
   5) repeating steps 3) and 4) for each conductive object identified on the touch sensitive surface while moving towards the second side; and
   6) using a threshold counter to determine the total number of objects that are on the touch sensitive surface by incrementing a threshold counter when analysis shows that a positive slope has been measured and decrementing the threshold counter when analysis shows that a negative slope has been measured, and assigning the total number of objects on the touch sensitive surface to be the number of times that the threshold counter is incremented.

2. The method as defined in claim 1 wherein the step of setting a threshold value is further comprised of selecting a threshold value that is generally above a noise level of the touch sensitive surface.

3. The method as defined in claim 1 wherein the step of finding a negative slope after the positive slope further comprises assigning the negative slope to be a measurement of signal strength of two adjacent electrodes, wherein the signal strength must fall at least one threshold unit.

4. The method as defined in claim 1 wherein the method further comprises determining a signal strength for the conductive object, wherein the method comprises the step of determining the total rise in threshold units when a positive slope is detected.

5. The method as defined in claim 1 wherein the step of determining if any two measurements of adjacent X electrodes show a positive slope in signal strength further comprises:
   1) comparing a measurement of signal strength of a first X electrode and a second X electrode and determining if the change in signal strength is a positive or a negative slope; and
   2) comparing a measurement of signal strength of a next set of X electrodes and determining if the change in signal strength is a positive or a negative slope until all of the sets of X electrodes are compared.

6. A method for determining the number of objects that are present on a touch sensitive surface, said method comprised of:
   1) providing a plurality of parallel X electrodes disposed on a first layer of a substantially transparent substrate, and a plurality of parallel Y electrodes disposed on a second layer of the substrate, wherein the X electrodes are coplanar with and orthogonal to the Y electrodes;
   2) measuring a signal on each of the plurality of Y electrodes, proceeding from a first side of the Y electrodes to an opposite second side;
   3) analyzing the measurements in order to identify objects by determining if any two measurements of adjacent Y electrodes show a positive slope in signal strength that is sufficiently large, and which passes from below a threshold value to above the threshold value, so as to indicate the presence of a conductive object, wherein finding the positive slope includes selecting the threshold value for the signal strength and selecting a threshold unit, and then assigning the positive slope to be a measurement of signal strength of two adjacent electrodes, wherein the signal strength must rise from below the threshold value to above the threshold value, and wherein the total change in measured signal strength must be at least two threshold units;
   4) analyzing the measurements in order to identify a negative slope after the positive slope;
   5) repeating steps 3) and 4) for each conductive object identified on the touch sensitive surface while moving towards the second side; and
   6) using a threshold counter to determine the total number of objects that are on the touch sensitive surface by incrementing a threshold counter when analysis shows that a positive slope has been measured and decrementing the threshold counter when analysis shows that a negative slope has been measured, and assigning the total number of objects on the touch sensitive surface to be the number of times that the threshold counter is incremented.

7. The method as defined in claim 6 wherein the step of setting a threshold value is further comprised of the step of selecting a threshold value that is generally above a noise level of the touch sensitive surface.

8. The method as defined in claim 6 wherein the step of finding a negative slope after the positive slope further comprises the step of assigning the negative slope to be a measurement of signal strength of two adjacent electrodes, wherein the signal strength must fall at least one threshold unit.

9. The method as defined in claim 6 wherein the method further comprises the step of determining a signal strength for the conductive object, wherein the method comprises the step of determining the total rise in threshold units when a positive slope is detected.

10. The method as defined in claim 6 wherein the step of determining if any two measurements of adjacent Y electrodes show a positive slope in signal strength further comprises the steps of:
1) comparing a measurement of signal strength of a first Y electrode and a second Y electrode and determining if the change in signal strength is a positive or a negative slope; and
2) comparing a measurement of signal strength of a next set of Y electrodes and determining if the change in signal strength is a positive or a negative slope until all of the sets of Y electrodes are compared.

* * * * *